May 16, 1967 D. R. ROYER ET AL 3,319,796
FILTER ELEMENT
Filed Sept. 2, 1964
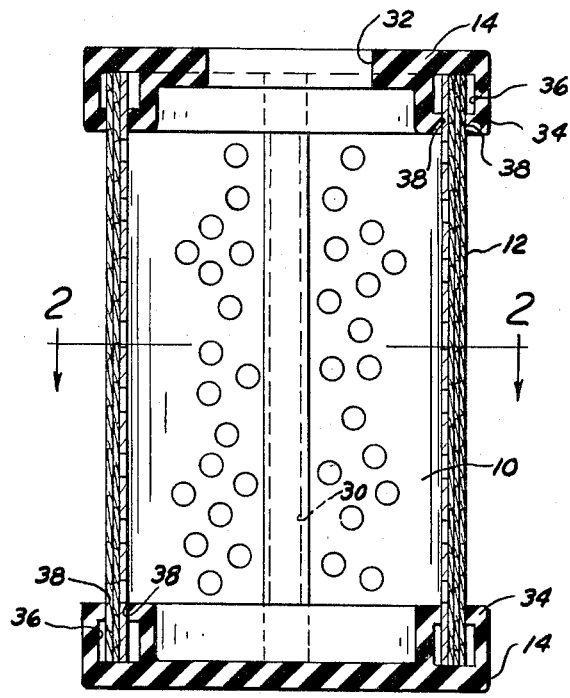
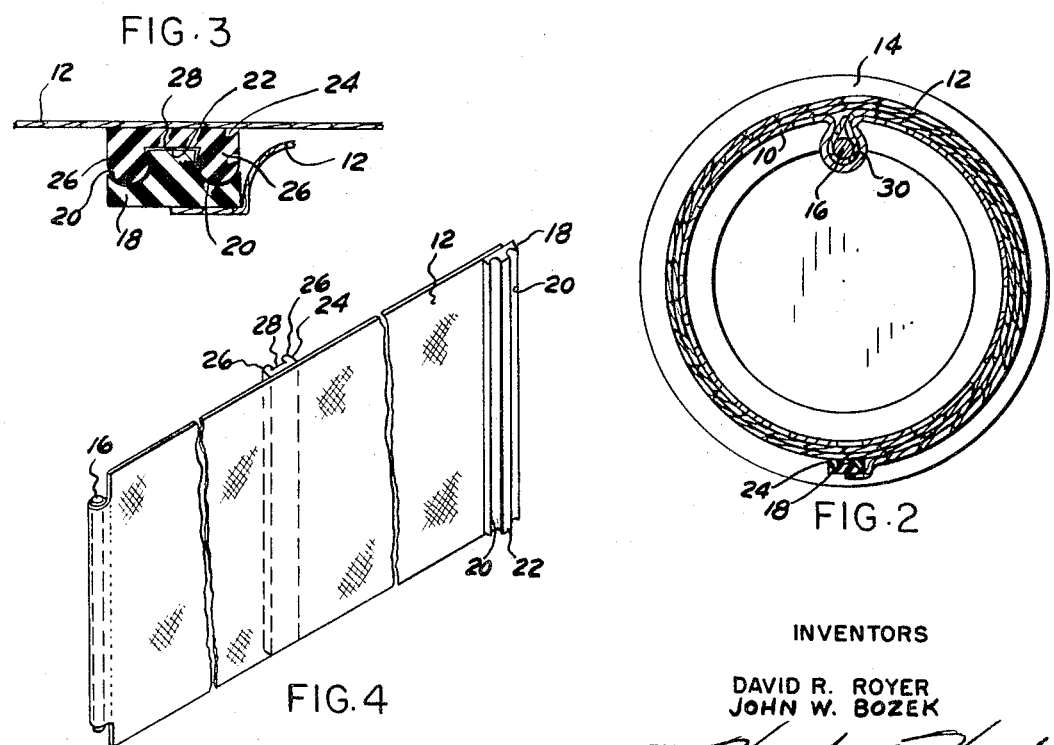
INVENTORS
DAVID R. ROYER
JOHN W. BOZEK
BY
ATTORNEYS

United States Patent Office 3,319,796
Patented May 16, 1967

3,319,796
FILTER ELEMENT
David R. Royer, Detroit, and John W. Bozek, Waterford, Mich., assignors to The Rosaen Filter Company, Hazel Park, Mich., a corporation of Michigan
Filed Sept. 2, 1964, Ser. No. 393,862
7 Claims. (Cl. 210—457)

The present invention relates to filter elements for fluid filtering devices and more particularly to an improved construction for depth type filter elements.

Depth type filtration refers to those fluid systems in which the fluid to be filtered is conducted through relatively long tortuous paths to accomplish the filtration. This type of filtration is much more effective than surface type filtration in which the fluid to be filtered is directed through a relatively thin layer of filtering material in that depth type filtration prevents the passage of relatively long narrow particles which might pass through surface type filtering media. However, depth type filter elements are much more difficult to clean than surface type filter elements because trapped particles must be flushed back through the long irregular passages in which they are lodged.

The present invention provides a depth type filter element constructed of wound layers of surface type filtering material. The overlapping layers form long tortuous paths which provide depth type filtration. To clean the filter element of the present invention means are provided for separating the filtering media to form a long continuous sheet which is readily handled and treated for the removal of trapped particles so that it is not necessary to flush the trapped particles through the passages formed for filtering the fluid.

It is an object then of the present invention to improve the construction of depth type filter elements by providing such a filter element constructed of a wound sheet of surface type filtering material.

It is another object of the present invention to provide a depth type filter element which may be readily cleaned by providing such an element constructed of a wound sheet of filtering material and providing means for unwinding the material for purposes of cleaning.

Still further objects and advantages of the present invention will readily occur to one skilled in the art to which the invention pertains upon reference to the following drawings in which like characters refer to like parts throughout the several views and in which—

FIG. 1 is a longitudinal cross-sectional view of a preferred filter element of the present invention.

FIG. 2 is a cross-sectional view taken substantially at line 2—2 of FIG. 1;

FIG. 3 is a fragmentary enlarged detailed view of structure illustrated in FIG. 2; and FIG. 4 is a perspective view of the preferred sheet of filtering material of the present invention.

Now referring to the drawings for a more detailed description of the present invention, a preferred filter element is therein illustrated as comprising a substantially cylindrical, perforated support member 10, a sheet of surface type filtering material 12 wrapped around and secured to the support member 10 as will be described in greater detail below, and an end cap 14 carried at each end of the support member 10 and wound filtering material 12.

As can best be seen in FIGS. 2-4, the filtering material 12 is preferably in the form of a rectangular sheet having an elongated rod 16 secured at one lateral edge thereof. A male fastener member 18 of a preferred fastening means is carried at the opposite lateral edge of the sheet of filtering material 12 and comprises an elongated strip of resilient material having, as can best be seen in FIG. 3, a pair of elongated arcuately formed grooves 20 spaced to form an elongated projection 22. A female fastening member 24 of the fastening means is secured to the sheet 12 on a surface opposite the surface carrying the male member 18 and spaced from the lateral edge of the sheet 12 carrying the male member 18 a distance substantially equal to the circumference of the support member 10 for a reason which will be more apparent as the description proceeds. The female member 24 comprises an elongated strip of resilient material formed complementary to the male member 18 and having a pair of elongated arcuate projections 26 spaced to form an elongated recess 28 therebetween.

As can best be seen in FIG. 2, the support member 10 is preferably bent inwardly at a portion of the lateral surface thereof to form a substantially cylindrical recess 30. To assemble the filter element of the present invention the rod 16 of the filtering material 12 is snapped into place in the recess 30. The sheet 12 is then wound about the exterior surface of the perforated support member 10 to form several layers and until the lateral edge carrying the male member 18 is brought to a position adjacent the female member 24. Since these members are spaced a distance substantially equal to the circumference of the support member 10 when the members 18 and 24 meet, the filtering sheet 12 will be tightly wound about the support member 10. The projection 22 of the male member 18 is then inserted into the complementary recess 28 of the female member 24 to secure the filtering material 12 in place.

As can best be seen in FIG. 1, one of the end caps 14 is provided with a central outlet opening 32. Each of the end caps 14 is provided with a peripheral axially extending projection 34 having an annular recess 36 formed therein to provide gripping portions 38. The end caps 14 are preferably constructed of a resilient material so that they can be snapped over the edges of the support member 10 and wound filtering material 12 with the gripping portions 38 securely clamping the end caps 14 to the support member 10 and the filtering material 12.

It is apparent that the multiple layers formed by the wound filtering material 12 provides a depth type filtration. In effect then a depth type filter element has been constructed of relatively inexpensive surface type filtering material. When it is desired to clean the filter element of the present invention the end caps 14 are readily removed, the fastening means are disengaged and the filtering material 12 is unwound from the support member 10. With the filtering material 12 removed from the support member 10, it can be readily cleaned or if desired, replaced with a new filtering material 12. The important advantage of the construction of the present invention resides in the fact that unlike other heretofore known depth type filter elements cleaning of the filtering media does not require that the foreign particles be back flushed through the long tortuous passages formed by the filtering media. In effect, then the present invention provides a depth type filter element which can be as readily cleaned as surface type filter elements.

It is also apparent that although we have described but a single embodiment of our invention, many other changes and modifications can be made therein without departing from the spirit of the invention as expressed by the scope of the appended claims.

We claim:
1. A filter element comprising
   (a) a substantially cylindrical perforated support member,
   (b) a sheet of filtering material and means detachably securing one edge of said sheet to said support member,

(c) said sheet being wound about said support member in a wound position, and (d) means carried by said sheet for removably fastening said sheet in said wound position, said means carried by said sheet being spaced from said securing means by a longitudinal portion of said sheet.

2. The filter element as defined in claim 1 and including an end cap removably carried at each end of said support member and said wound sheet of filtering material.

3. The filter element as defined in claim 1 and in which said securing means comprises, (a) an axially extending recess being provided in said support member, and (b) an elongated rod carried at one lateral edge of said sheet and being adapted to be received in said recess.

4. The filter element as defined in claim 1 and in which said fastening means comprises (a) an elongated resilient male fastening member carried on one surface of said sheet at the free lateral edge thereof, (b) an elongated resilient female fastening member carried on the opposite surface of said sheet intermediate the lateral edges at a position spaced from the free edge thereof a distance substantially equal to the circumference of said support member and from the opposite edge a distance at least as great as the circumference of said support member, (c) said fastening members having complementary surfaces adapted to engage and resiliently lock one to the other.

5. A filter element comprising (a) a substantially cylindrical perforated support member, (b) a substantially rectangular sheet of filtering material and means detachably securing one lateral edge of said sheet to the exterior surface of said support member, (c) said sheet in a wound position being wound about said support member to form a plurality of filtering layers, and (d) means carried by said sheet for removably fastening said sheet in said wound position, said means carried by said sheet being spaced from said securing means by a longitudinal portion of said sheet.

6. The element as defined in claim 5 and including a pair of resilient end caps each having an annular recess for receiving the annular edge of said support member and said wound filter sheet and being axially removable from said support member and said wound filter sheet.

7. The filter element as defined in claim 5 and in which said fastening means comprises (a) an elongated resilient male fastening member carried on one surface of said sheet at the free lateral edge thereof, (b) an elongated resilient female fastening member carried on the opposite surface of said sheet intermediate the lateral edges thereof and substantially parallel to said male fastening member and spaced from said male fastening member a distance substantially equal to the circumference of said support member whereby as said sheet is completely wound about said support member said male fastening member is brought to a position closely adjacent said female fastening member, and (c) said male fastening member having an elongated projection and said female fastening member having an elongated recess adapted to resiliently receive and retain said projection of said male fastening member.

References Cited by the Examiner

UNITED STATES PATENTS

| | | | |
|---|---|---|---|
| 2,055,251 | 9/1936 | Duvall | 210—404 |
| 2,478,109 | 8/1949 | Kamrath. | |
| 2,742,160 | 4/1956 | Fogwell | 210—494 X |
| 3,038,205 | 6/1962 | Plummer | 138—166 X |
| 3,058,592 | 9/1962 | Nugent | 210—494 X |
| 3,063,888 | 11/1962 | Howard et al. | 210—494 X |
| 3,076,554 | 2/1963 | Bub | 210—494 X |
| 3,198,228 | 8/1965 | Naito | 138—166 X |

FOREIGN PATENTS 1,204,546   8/1959   France.

REUBEN FRIEDMAN, *Primary Examiner.*

C. M. DITLOW, *Assistant Examiner.*